(12) United States Patent
Rudy et al.

(10) Patent No.: US 11,124,392 B2
(45) Date of Patent: Sep. 21, 2021

(54) OPTICAL DETECTION AND ANALYSIS FOR BOOM ANGLES ON A CRANE

(71) Applicant: Manitowoc Crane Companies, LLC, Manitowoc, WI (US)

(72) Inventors: John R. Rudy, Greencastle, PA (US); Matthew Thoresen, Chambersburg, PA (US)

(73) Assignee: Manitowoc Crane Companies, LLC, Manitowoc, WI (US)

(*) Notice: Subject to any disclaimer, the term of this patent is extended or adjusted under 35 U.S.C. 154(b) by 0 days.

(21) Appl. No.: 15/819,369

(22) Filed: Nov. 21, 2017

(65) Prior Publication Data

US 2018/0143011 A1 May 24, 2018

Related U.S. Application Data

(60) Provisional application No. 62/425,449, filed on Nov. 22, 2016.

(51) Int. Cl.
*B66C 13/16* (2006.01)
*B66C 23/36* (2006.01)
(Continued)

(52) U.S. Cl.
CPC .............. *B66C 13/16* (2013.01); *B66C 13/18* (2013.01); *B66C 13/46* (2013.01); *B66C 13/48* (2013.01);
(Continued)

(58) Field of Classification Search
CPC combination set(s) only.
See application file for complete search history.

(56) References Cited

U.S. PATENT DOCUMENTS 4,216,868 A 8/1980 Geppert
4,577,344 A 3/1986 Warren et al.
(Continued)

FOREIGN PATENT DOCUMENTS

AU 637377 B 10/1993
AU 2015372216 A1 7/2016
(Continued)

OTHER PUBLICATIONS

European Search Report issued by ISA/EPO in connection with EP17153446 dated Jul. 7, 2017.
(Continued)

*Primary Examiner* — Zhiyu Lu
(74) *Attorney, Agent, or Firm* — Klintworth & Rozenblat IP LLP

(57) ABSTRACT

A crane includes a carrier, a superstructure coupled to the carrier, the superstructure including a boom, and an optical detection system having an image capture assembly including one or more image capture devices configured to capture an image of one or more of the carrier and the superstructure, and an optical control system. The optical control system is configured to detect one or more objects in the captured image, the one or more objects selected from: the carrier, the superstructure, and a marker, analyze the one or more detected objects, and determine a status of the boom based on the analysis of the one or more detected objects. The optical detection system and a method for determining the status of the boom are provided as well.

17 Claims, 11 Drawing Sheets

(51) Int. Cl.
*B66C 15/06* (2006.01)
*G06T 7/00* (2017.01)
*G06T 7/73* (2017.01)
*G06T 7/13* (2017.01)
*B66C 13/46* (2006.01)
*B66C 13/18* (2006.01)
*G06T 7/60* (2017.01)
*G06T 7/70* (2017.01)
*G01B 11/26* (2006.01)
*B66C 13/48* (2006.01)
*B66C 23/42* (2006.01)
*B66C 13/06* (2006.01)

(52) U.S. Cl.
CPC ............ *B66C 15/06* (2013.01); *B66C 15/065* (2013.01); *B66C 23/36* (2013.01); *B66C 23/42* (2013.01); *G01B 11/26* (2013.01); *G06T 7/0004* (2013.01); *G06T 7/13* (2017.01); *G06T 7/60* (2013.01); *G06T 7/70* (2017.01); *G06T 7/74* (2017.01); *B66C 13/06* (2013.01); *G06T 2207/30164* (2013.01); *G06T 2207/30204* (2013.01); *G06T 2207/30242* (2013.01)

(56) References Cited

U.S. PATENT DOCUMENTS

| | | | |
|---|---|---|---|
| 4,826,391 A * | 5/1989 | Lawrence | B25J 13/088 414/688 |
| 4,907,768 A | 3/1990 | Masseron et al. | |
| 5,251,768 A | 10/1993 | Yoshimatsu et al. | |
| 5,392,935 A | 2/1995 | Kazama et al. | |
| 5,642,822 A | 7/1997 | Monzen et al. | |
| 5,645,181 A | 7/1997 | Ichiba et al. | |
| 5,726,907 A | 5/1998 | Davidson et al. | |
| 5,967,347 A | 10/1999 | Miyata et al. | |
| 6,065,619 A | 5/2000 | Miyata et al. | |
| 6,140,930 A | 10/2000 | Shaw | |
| 6,170,681 B1 | 1/2001 | Yoshimatsu | |
| 6,182,843 B1 | 2/2001 | Tax et al. | |
| 6,256,553 B1 | 7/2001 | Erikkila | |
| 6,549,139 B2 * | 4/2003 | Shaw, Jr. | B66C 13/44 212/276 |
| 6,554,144 B2 | 4/2003 | Hashiguchi et al. | |
| 6,568,547 B1 | 5/2003 | Kretschmer et al. | |
| 6,588,610 B2 | 7/2003 | Ong et al. | |
| 6,634,112 B2 | 10/2003 | Carr et al. | |
| 6,718,048 B1 | 4/2004 | Kawata et al. | |
| 6,748,104 B1 | 6/2004 | Bachelder et al. | |
| 6,765,224 B1 | 7/2004 | Favreau et al. | |
| 6,894,621 B2 * | 5/2005 | Shaw | B66C 13/44 212/276 |
| 7,106,883 B2 | 9/2006 | Uchida et al. | |
| 7,121,012 B2 | 10/2006 | Voecks | |
| 7,289,875 B2 | 10/2007 | Recktenwald et al. | |
| 7,289,876 B2 | 10/2007 | Lussen et al. | |
| 7,310,431 B2 | 12/2007 | Gokturk et al. | |
| 7,472,009 B2 | 12/2008 | Baldwin | |
| 7,599,762 B2 | 10/2009 | Discenzo et al. | |
| 7,648,036 B2 | 1/2010 | Recktenwald et al. | |
| 7,656,459 B2 | 2/2010 | Catanzaro | |
| 7,936,143 B2 | 5/2011 | Ikeguchi et al. | |
| 7,950,539 B2 | 5/2011 | Henriksson | |
| 8,005,598 B2 | 8/2011 | Terashima et al. | |
| 8,267,264 B2 | 9/2012 | Bryfors et al. | |
| 8,272,521 B1 | 9/2012 | Kemmerly et al. | |
| 8,385,594 B2 | 2/2013 | Hofmann et al. | |
| 8,504,253 B2 | 8/2013 | Stantchev et al. | |
| 8,618,949 B2 | 12/2013 | Maynard et al. | |
| 8,659,408 B2 | 2/2014 | Taylor et al. | |
| 8,682,541 B2 | 3/2014 | Best et al. | |
| 8,937,651 B2 | 1/2015 | Guissin et al. | |
| 9,156,663 B2 | 10/2015 | Roeben et al. | |
| 9,278,834 B2 | 3/2016 | Pech et al. | |
| 9,300,954 B2 | 3/2016 | Tanizumi et al. | |
| 9,335,318 B2 | 5/2016 | Ilaka et al. | |
| 9,394,146 B2 | 7/2016 | Schroder | |
| 9,440,824 B2 | 9/2016 | Stuehrwoldt et al. | |
| 9,556,006 B2 | 1/2017 | Schneider et al. | |
| 2003/0137590 A1 | 7/2003 | Barnes et al. | |
| 2003/0161524 A1 | 8/2003 | King | |
| 2005/0192732 A1 | 9/2005 | Narisawa et al. | |
| 2005/0226584 A1 | 10/2005 | Williams et al. | |
| 2005/0232626 A1 | 10/2005 | Schulte et al. | |
| 2010/0070179 A1 | 3/2010 | Cameron | |
| 2010/0189226 A1 | 7/2010 | Kotowski et al. | |
| 2010/0277298 A1 | 11/2010 | Leong et al. | |
| 2011/0031202 A1 | 2/2011 | Pech et al. | |
| 2011/0140419 A1 * | 6/2011 | Stockner | H02K 7/1838 290/44 |
| 2011/0187548 A1 | 8/2011 | Maynard et al. | |
| 2011/0272376 A1 | 11/2011 | Jung et al. | |
| 2012/0185159 A1 * | 7/2012 | Yamauchi | B66C 13/16 701/123 |
| 2013/0013251 A1 * | 1/2013 | Schoonmaker | B66C 13/46 702/152 |
| 2013/0079974 A1 * | 3/2013 | Stake | B66C 13/46 701/32.9 |
| 2013/0119256 A1 | 5/2013 | Husmann et al. | |
| 2013/0345857 A1 | 12/2013 | Lee et al. | |
| 2014/0224755 A1 | 8/2014 | Eriksson et al. | |
| 2015/0122761 A1 | 5/2015 | Ford et al. | |
| 2015/0130375 A1 | 5/2015 | Sutherland | |
| 2015/0142277 A1 | 5/2015 | Eriksson et al. | |
| 2015/0217455 A1 | 8/2015 | Kikkeri et al. | |
| 2015/0226369 A1 | 8/2015 | Troy et al. | |
| 2015/0256797 A1 | 9/2015 | Torben | |
| 2015/0329333 A1 | 11/2015 | Fenker | |
| 2015/0344271 A1 | 12/2015 | Schneider et al. | |
| 2016/0006947 A1 | 1/2016 | Kowatari et al. | |
| 2016/0016763 A1 | 1/2016 | Lee et al. | |
| 2016/0031681 A1 | 2/2016 | Delplace | |
| 2016/0031683 A1 | 2/2016 | Fenker et al. | |
| 2016/0035251 A1 | 2/2016 | Delplace | |
| 2016/0107866 A1 | 4/2016 | Schoonmaker et al. | |
| 2016/0119589 A1 | 4/2016 | Tanizumi et al. | |
| 2016/0176686 A1 | 6/2016 | Schoonmaker | |
| 2016/0236913 A1 | 8/2016 | Ilaka et al. | |
| 2017/0217737 A1 | 8/2017 | Rudy et al. | |
| 2018/0044149 A1 | 2/2018 | Weckbecker et al. | |
| 2018/0072540 A1 | 3/2018 | Stangl | |
| 2018/0141787 A1 | 5/2018 | Rudy et al. | |
| 2018/0141789 A1 | 5/2018 | Rudy et al. | |
| 2018/0143011 A1 | 5/2018 | Rudy et al. | |
| 2018/0209156 A1 | 7/2018 | Pettersson | |
| 2018/0252921 A1 | 9/2018 | Rantala et al. | |
| 2019/0112165 A1 | 4/2019 | Palberg et al. | |
| 2019/0270624 A1 | 9/2019 | Sembo | |
| 2019/0276281 A1 | 9/2019 | Hofmeister et al. | |

FOREIGN PATENT DOCUMENTS

| | | |
|---|---|---|
| CN | 2154484 Y | 1/1994 |
| CN | 102193559 A | 9/2011 |
| CN | 102661952 A | 9/2012 |
| CN | 102795547 A | 11/2012 |
| CN | 103398668 A | 11/2013 |
| CN | 203319435 U | 12/2013 |
| CN | 102756976 B | 7/2014 |
| CN | 104477723 A | 4/2015 |
| CN | 104535356 A | 4/2015 |
| CN | 105668419 A | 6/2016 |
| DE | 102006046469 A1 | 4/2008 |
| DE | 102013008348 A1 | 11/2014 |
| DE | 102014018063 A1 | 6/2016 |
| EP | 2383566 A1 | 11/2011 |
| EP | 2722302 A1 | 4/2014 |
| EP | 2914540 B1 | 9/2015 |
| EP | 2899496 A1 | 8/2016 |
| JP | 2056397 A | 2/1990 |
| JP | H0256397 A | 2/1990 |
| JP | H08157188 A | 6/1996 |

(56) References Cited

FOREIGN PATENT DOCUMENTS

| | | | | |
|---|---|---|---|---|
| JP | 2003300692 A | 10/2003 | | |
| JP | 2008074594 A | 4/2008 | | |
| JP | 2009073248 A | 4/2009 | | |
| JP | 2010241548 A | 10/2010 | | |
| JP | 2013120176 A | 6/2013 | | |
| JP | 2013193825 A | 9/2013 | | |
| JP | 2015101470 | * | 6/2015 | ............ B66C 23/88 |
| JP | 2015229582 A | 12/2015 | | |
| JP | 2016166086 A | 9/2016 | | |
| JP | 2016166091 A | 9/2016 | | |
| JP | 2017186163 A | 10/2017 | | |
| JP | 2017186164 A | 10/2017 | | |
| JP | 2017186165 A | 10/2017 | | |
| WO | 9119665 A1 | 2/1991 | | |
| WO | 1999008956 A1 | 2/1999 | | |
| WO | 2004080882 A1 | 9/2004 | | |
| WO | 2009047719 A2 | 4/2009 | | |
| WO | 2013059599 A1 | 4/2013 | | |
| WO | 2014019132 A1 | 2/2014 | | |
| WO | 2014047840 A1 | 4/2014 | | |
| WO | 2016101500 A1 | 6/2016 | | |
| WO | 2017067651 A1 | 4/2017 | | |
| WO | 2017159321 A1 | 9/2017 | | |
| WO | 2018160119 A1 | 9/2018 | | |

OTHER PUBLICATIONS

"360 degree vehicle camera systems", https://www.vdo-instruments.com/camera-systems/360-degree-vehicle-camera-systems.html, captured Oct. 9, 2017.

"ProViu ASL 360", http://www.asl360.co.uk/products/, captured Oct. 9, 2017.

Extended European Search Report issued by EPO in connection with EP17203098 dated Apr. 17, 2018.

Extended European Search Report issued by EPO in connection with EP17203102 dated Apr. 18, 2018.

Extended European Search Report issued by EPO in connection with EP17203093 dated Apr. 18, 2018.

Extended European Search Report issued by EPO in connection with EP17203109 dated May 4, 2018.

Vallan A, Molinari F. A vision-based technique for lay length measurement of metallic wire ropes. IEEE Trans Instrum Meas 2009; 58. (Year: 2009).

Extended European Search Report issued by EPO in connection with EP Appl. 19207783.2 dated Mar. 31, 2020.

* cited by examiner

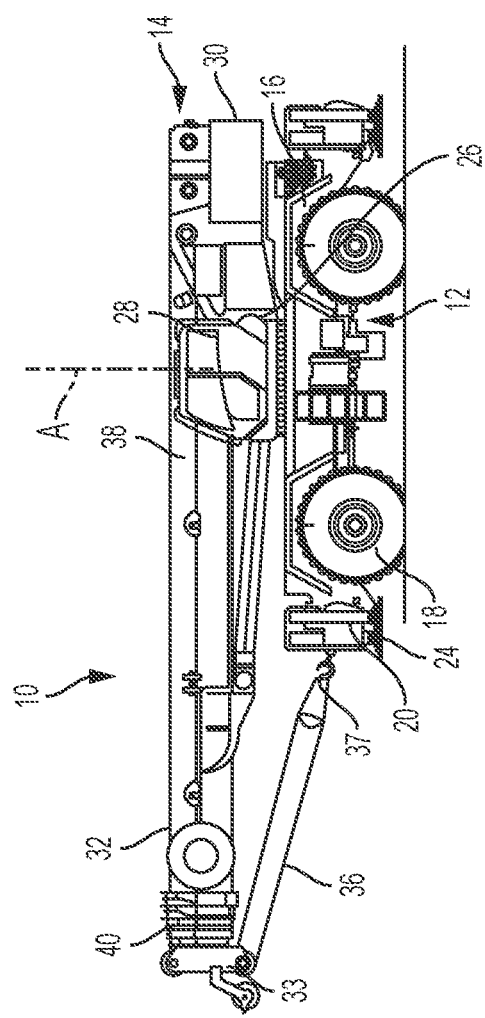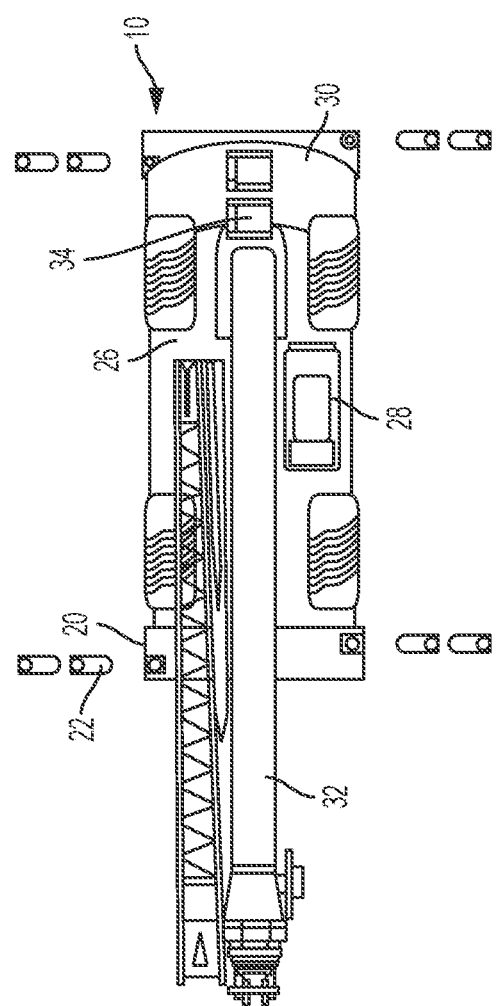

OPTICAL DETECTION AND ANALYSIS FOR BOOM ANGLES ON A CRANE

BACKGROUND

The following description relates to the detection and analysis of one or more crane components to determine a status of a boom on a crane, and in particular, the optical detection and analysis to determine a slew angle or lift angle of the boom.

A crane, such as a mobile crane, typically includes a lower works, or carrier, and an upper works, or superstructure, mounted on the lower works. The lower works includes, for example, a frame, a suspension mounted to the frame, tires mounted to the suspension, and one or more outriggers each having an arm selectively extendable and retractable in a substantially horizontal direction and a jack coupled to the arm selectively extendable and retractable in a substantially vertical direction. The upper works may be rotatably mounted on the lower works to rotate about a vertical axis. The upper works may include, for example, a boom, an operator cab, a counterweight assembly and a hoist for winding and unwinding a rope. The upper works also includes a rotating bed on which the above-noted components are mounted.

The crane is capable of performing a number of movements. For example, the upper works, including the boom, may swing, or slew, left or right (i.e., rotate on the vertical axis counterclockwise or clockwise), the boom may lift up or down (i.e., increase or decrease an angle relative to the horizontal), and the boom may extend or retract telescopically.

Various crane components, including those described above, may be monitored to determine a status of the crane component. Typically, sensors such as proximity sensors, load cells, RFID sensors and the like may be used to detect a crane component. For example, a proximity sensor may detect whether an outrigger is in a fully extended or retracted condition or whether a counterweight is properly positioned. Some crane components may be visually detected as well, for example, by the operator or a spotter.

A particular crane component to be monitored is the boom. In particular, a position of the boom may be monitored. A position of the boom may refer to a slew angle of the boom, a lift angle of the boom, a length of the boom, or a combination thereof. As described above, the boom is typically rotatable on a vertical axis to change a slew angle, rotatable on a horizontal axis to change a lift angle, and extendable and retractable along a longitudinal axis to change a length. A change in position of the boom, i.e. a change in the slew angle, the lift angle or the length of the boom, may result in a change to the load capacity of the crane. Thus, it is beneficial for an operator to be aware of the position of the boom.

Currently, a position of the boom may be monitored visually by an operator or spotter, or with one or more sensors. Such sensors may include proximity sensors, limit switches, rotary sensors, magnetic sensors and the like. However, manual or visual inspection of the position of the boom may be time consuming and inaccurate. In addition, sensors may fail or become less reliable over time due to regular wear.

Accordingly, it is desirable to provide an image-based detection and analysis system for determining a position of boom, and in particular, one or more of a slew angle and a lift angle of the boom.

SUMMARY

According to one aspect, a crane includes a carrier, a superstructure coupled to the carrier, the superstructure including a boom, and an optical detection system. The optical detection system includes an image capture assembly having one or more image capture devices configured to capture an image of one or more of the carrier and the superstructure, and an optical control system. The optical control system is configured to detect one or more objects in the captured image, the one or more objects selected from: the carrier, the superstructure, and a marker, analyze the one or more detected objects, and determine a status of the boom based on the analysis of the one or more detected objects.

According to another aspect, there is provided an optical detection system for a crane having a carrier and a superstructure mounted on the carrier, the superstructure having a boom. The system includes an image capture assembly having one or more image capture devices configured to capture an image of the carrier, the superstructure, or both, and an optical control system. The optical control system is configured to detect one or more objects in the captured image, the one or more objects selected from: the carrier, the superstructure, and a marker, analyze the one or more detected objects, and determine a status of the boom based on the analysis of the one or more detected objects.

According to another aspect, a method of determining a status of a boom on a crane includes capturing, with an image capture assembly, an image of a crane carrier, a crane superstructure, or both, detecting, with an optical control system, one or more objects in the captured image, wherein the one or more objects include one or more of: the crane carrier, the crane superstructure, and a marker, analyzing, with the optical control system, the detected objects, and determining, with the optical control system, a status of the boom based on the analysis of the detected objects.

Other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

FIG. 1 is a side view of a crane according to an embodiment;

FIG. 2 is a top view of the crane of FIG. 1;

DETAILED DESCRIPTION

Figure 3:
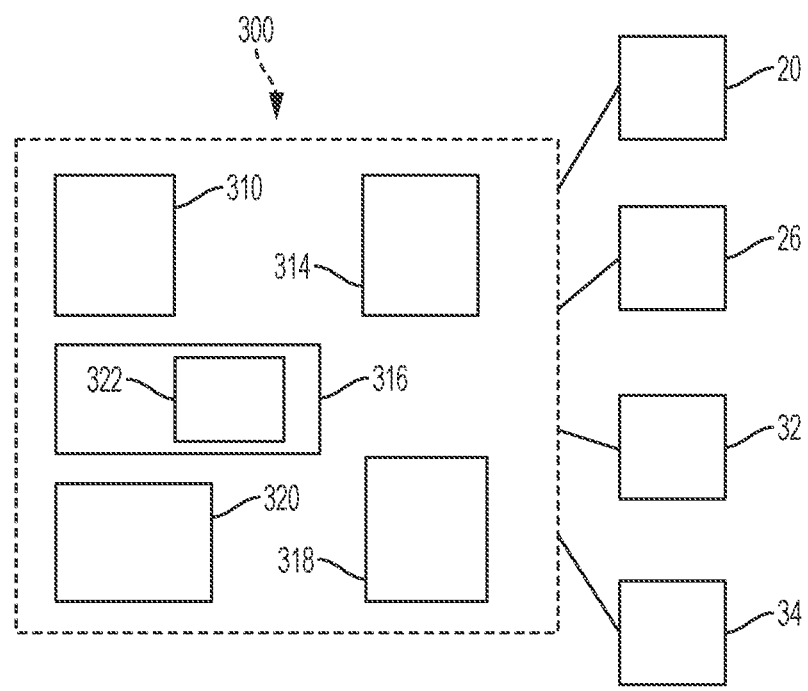
FIG. 3 is a block diagram of a crane control system according to an embodiment.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

FIG. 1 is a side view of a crane 10 according to an embodiment described herein and FIG. 2 is a top view of the crane 10 in FIG. 1. Referring to FIGS. 1 and 2, the crane 10 may be a mobile crane, such as, but not limited to, a rough terrain crane, an all-terrain crane, a truck mounted crane or an industrial crane. The crane 10 generally includes crane components such as a carrier, or lower works, 12 and a superstructure, or upper works, 14. In one embodiment, the carrier 12 may include various crane components, for example, a frame 16, a plurality of ground engaging elements 18 such as tires, and a suspension (not shown) interconnected between the frame 16 and the ground engaging elements 18. The carrier 12 may also include other crane components such as one or more outrigger assemblies 20. In one embodiment, each outrigger assembly 20 includes a jack 22 that is movable generally in a vertical direction to engage and disengage the ground or other support surface. Each outrigger assembly 20 may also include an arm 24 that is movable generally in a horizontal direction to extend toward and away from the frame 16. In one embodiment, the arm 24 is a telescoping arm having a fixed section, such as an outrigger box, and one or more telescoping sections movable relative to the fixed section. Each jack 22 may be mounted to a respective arm 24.

The superstructure 14 is coupled to the carrier 12. In one embodiment, the superstructure 14 is rotatably coupled to the carrier 12 and is configured to rotate relative to the carrier 12 about a vertical axis 'A' (see FIG. 1). In one embodiment, the superstructure 14 may also include crane components, for example, a rotating bed 26, an operator cab 28, a counterweight assembly 30, a boom 32, a hoist 34 for winding and unwinding a rope 36 and a hook block 37 connected to the rope 36. In another embodiment, the counterweight assembly 30 may be mounted to the carrier 12.

In one embodiment, the boom 32 may be a telescoping boom, such as a hydraulic telescoping boom. The boom 32 may include a base section 38 and one or more nested, telescoping sections 40 configured for telescoping extension and retraction relative to the base section 38. The one or more telescoping sections 40 may be driven, for example, by a linear actuator (not shown). The rope 36 may extend from the hoist 34 generally along the boom 32, and extend from a boom tip 33. The hook block 37 is connected to the rope 36 at a distal end of the rope 36, opposite to the hoist 34.

It is understood that present disclosure is not limited to mobile cranes of the type described above. For example, the crane 10 may be a crawler crane, a tower crane or other lifting device having a boom movable in one or more of a slewing direction or a lifting direction. For example, in a tower crane, the lower works, or carrier, may be in the form of a tower, and the upper works, or superstructure may be coupled to the top of the tower. The boom may be formed as a jib on the superstructure.

Referring to FIG. 3, the crane 10 may also include a crane control system 300. The crane control system 300 may include one or more input devices 310, such as an operating knob, lever, switch, button, joystick, touch screen input, touch pad, keyboard, keypad and the like, configured to receive an input from an operator. The one or more input devices 310 are operably connected to an actuator (not shown) configured to control movement of a crane component in response to an input received at the input device 310. For example, the one or more input devices 310 may receive an input to control slewing movement of the boom 32 and rotating bed 26, lifting movement of the boom 32, telescoping movement (extension/retraction) of the boom 32, winding or winding of the rope 36 on the hoist 34, or movement of an outrigger assembly 20. In response to receiving the input, the actuator (not shown) may be actuated to control movement of the boom 32, hoist 34, outrigger 20 or other crane component in the desired manner. The actuator may be, for example, a linear actuator, rotary actuator, drive motor and other suitable actuators known to those having skill in the art.

In one embodiment, the crane control system 300 may include a computer processor 314, computer readable storage medium 316, a user interface 318 which may include the one or more input devices 310, and a communications interface 320. The crane control system 300 may be located in the cab 28 or remote from the cab 28. In some embodiments, components of the crane control system 300 may be distributed in different sections of the crane 10 or on devices remote from the crane 10. The computer readable storage medium 316 is operably coupled to the computer processor 314 such that it is able to communicate with the computer processor 314. The computer readable storage medium 316 stores instructions 322 that, when executed by the computer processor 314, cause the computer processor 314 to generate one or more signals to implement, or perform, functions. The computer readable storage medium 316 may also store information related to the operation of the crane 10. The user interface 318 is operably coupled to the computer processor 314 such that an operator is able to interact with computer processor 314. For example, through the user interface 318 the operator may obtain information related to the crane 10 operation and cause the computer processor 314 to generate one or more signals to implement a function. The operator may also input information to the user interface 314 or the one or more input devices 310 to cause the computer processor 314 to generate and transmit a control signal, via the communications interface 320, to the one or more of the actuators (not shown) to control or prevent movement of a crane component. In one embodiment, the instructions 322 stored at the computer readable storage medium 316 may be executed by the computer processor 314 in response to receipt of the input information from the user interface 318 such that a function is implemented by the computer processor 314 to transform the input information into the control signal.

Figure 4:
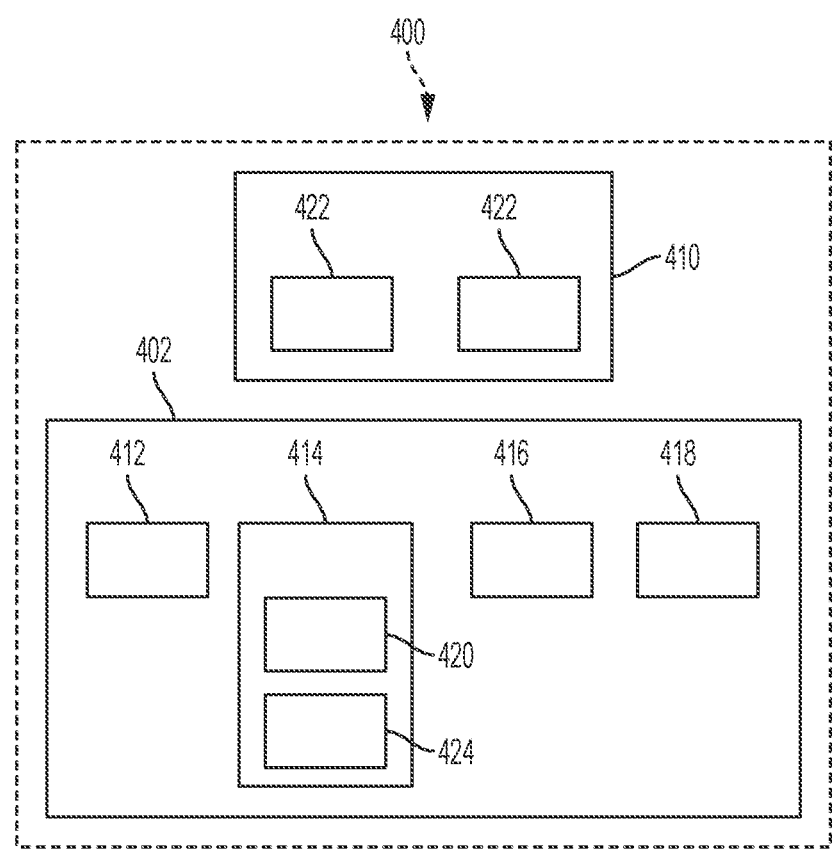
FIG. 4 is a block diagram of an optical detection system according to an embodiment.

Referring to FIG. 4, the crane 10 also includes an optical detection system 400. In one embodiment, the optical detection system 400 includes one or more image capture assemblies 410 and an optical control system 402 operably and communicably connected to the one or more image capture assemblies 410. The optical control system 402 includes a computer processor 412, a computer readable storage medium 414 and a communications interface 416, similar to those described above with respect to the crane control system 300. The optical control system 402 optionally includes a user interface 418, as well. The computer readable storage medium 414 stores instructions 420 that, when executed by the computer processor 412, cause the computer processor 412 to generate one or more signals to implement one or more functions. Alternatively, or in addition, the optical detection system 400 may be operably and communicably coupled to the crane control system 300, such that the optical detection system 400 and the crane control system 300 share one or more of a common computer processor, computer readable storage medium, user interface, and communications interface. In one embodiment, the optical control system 402 and the crane control system 300 may be one and the same. In one embodiment, components of the optical detection system 400 may be co-located with individual image capture assemblies 410, be located in a centralized location and communicably connected to the image capture assemblies 410 over a conventional communication interface, or be distributed among both.

Although certain processes, methods, analyses, calculations and/or determinations described herein may be referred as being carried out at one of the crane control system 300 or the optical detection system 400 (including the optical control system 402), it is understood that the present embodiments are not limited to these configurations. That is, the processes, methods, analyses, calculations and/or determinations described herein may, in some embodiments, be carried out interchangeably between, i.e., by either one of or both, the crane control system 300 and the optical detection system 400, even if a particular process, method, analysis, calculation or determination is not expressly described as such herein. Similarly, it is also understood that information, such as component specifications, sensor data and the like may be interchangeably input into either the crane control system 300 or the optical detection system 400.

For the purposes of consistency and understanding, the various methods, processes, analyses, calculations or determinations, as well as the input of various data or information, may be described herein as being carried out by, or input to, the optical detection system 400 or optical control system 402. However, as detailed above, the optical control system 400 and the crane control system 300 may share resources or components, operate interchangeably, or be one and the same. Accordingly, it is understood that the description herein of the methods, processes, analyses, calculations, determinations, including the input of data or information, being carried out by or input into the optical detection system 400 or optical control system 402, includes such processes, methods, analyses, calculations, determinations, or input of data or information, being carried out by or input to, the crane control system 300 as well.

In one embodiment, the one or more image capture assemblies 410 may be mounted, for example, on the superstructure 14, the carrier 12, or both. Suitable locations on the superstructure 14 for mounting the one or more image capture assemblies 410 include, but are not limited to, the rotating bed 26, the cab 28, the boom 32, the counterweight 30, or other intermediate or connecting structures between these components. In one embodiment, the image capture assembly 410 may be mounted to a gimbal, or similar device. Each image capture assembly 410 may include one or more image capture devices 422 configured for capturing an image across a desired field of view. In one embodiment, an image capture device 422 may be, for example, a camera, such as a digital camera, video camera, a stereo camera, a LiDAR sensor, a visible light camera, an infrared (IR) camera, an ultraviolet (UV) camera, and other suitable devices capable of capturing an image for object recognition. For example, in one embodiment, the image capture assembly 410 may be a single camera, such as a wide angle camera, or alternatively, a combination of cameras working in conjunction with one another to capture an image or images across the field of view.

The optical detection system 400 is configured to capture an image of one or more objects, detect one or more objects captured in the image, analyze the detected objects and determine a status of a crane component, a crane system, a crane or a series of cranes based, for example, on the analysis. The crane control system 300 may then alert the operator other personnel to the determined status and/or carry out crane control functions in response to the determined status. The alert may be provided, for example, as an audio, visual, or tactile (including vibratory) signal or alarm to the operator. Alternatively, or in addition, to carry out crane control functions, the crane control system 300 may generate a control signal to control an actuator, and in turn, movement (including starting and stopping) of a desired crane component, based on the determined status.

The status could be, for example, an absolute position, a relative position, movement, existence, speed, acceleration, dimensions, and length of extension or retraction of a crane component. Other statuses include, for example, the type of component and a physical configuration of the component. Further, the status could be a service condition of a crane component, which may include, for example, indications of wear, damage or need for maintenance, repair or replacement of the component. It is understood that these examples are not exhaustive and the determination of other statuses are envisioned.

The optical detection system 400 may detect the object in the captured image, and in some embodiments, determine a status of a crane component, using one or more detection methods, including but not limited to, one or more object recognition techniques, including such techniques known and understood by those having ordinary skill in the art. In some embodiments, the optical detection system 400 may analyze an image captured by the image capture assembly 410 to optically detect an object using optical recognition algorithms such as edge detection using brightness discontinuities. The optical recognition algorithms may be stored in the memory 414 and/or executed by the computer processor 412 at, for example, the optical control system 402 of the optical detection system 400. The optical detection system 400 may detect an edge or an end of an object using the above-noted edge detection and then, to determine a status, look up a position of the component based on the pixel location of the detected edge or end of the component. For example, in a field of view captured in an image, the optical control system 402 may be calibrated to assign a position or distance to one or more pixels in the captured image. Pixels associated with the detected edge or end of the object may then be compared to the positions or distances assigned to those pixels to determine a position or distance of the detected edge or end of the object.

Alternatively, or in addition, the computer readable storage medium 414 may have stored therein one or more stored images. The stored images may be captured substantially in the same field of view as the captured image from the image capture assembly 400 and may have known objects identified therein. The captured image may then be compared to the stored image, for example, to detect the presence or absence of a particular object. Crane components may also be detected in manner described above. The optical detection system 400 may then analyze the captured image, for example, by comparing relative positions of detected objects in the captured image and the known objects in the stored image or comparing relative conditions or appearances of the detected objects in the captured image and the stored image. The optical detection system 400 may then determine a status of the detected object, which may be a crane component, based on the comparison. In such an embodiment, the image capture assembly 410 may be positioned to capture images of the object at views which closely correspond to the views at which the stored images were taken. Accordingly, accurate comparisons may be made between stored images and captured images.

In other embodiments, the location of the end or an edge of the object may be calculated in real time based on the detected pixel location in the field of view of the image capture assembly 410. For example, if the end or edge of the object is determined to be at a particular angle relative to a centerline of the image capture assembly 410, then a table may give an extension corresponding to that particular angle. In other embodiments, the detected end or edge may be at a particular pixel location, which is then looked up by the system 400 on the chart to give an extension corresponding to that particular pixel location. In other embodiments, once the relative location of the object end or edge is detected, the physical length of the object may be calculated using commonly known techniques such as trigonometry or geometry.

Alternatively, or in addition, the optical detection system 400 may detect an object such as a visible target or marker 42 (see FIGS. 5 and 6) disposed on an object. Through such detection, the optical detection system 400 may analyze the marker 42 to identify the marker 42, and determine a status of a crane component, for example, a position of the crane component, movement of the crane component, and/or the existence of the crane component. In one embodiment, the marker 42 may be horizontal lines, but other patterns may be used as well. In other embodiment, the marker 42 may be a color coating on an object, such as the carrier 12. The optical detection system 400 may detect the marker 42 using conventional pattern recognition algorithms. The pattern recognition algorithms may be stored in a memory and/or executed by a processor of the optical control system 402 of the optical detection system 400, and/or at the individual image capture assemblies 410. In one embodiment, a plurality of known markers may be stored in the computer readable storage medium 414, and a marker 42 captured in an image may be compared to the known markers. If the detected marker 42 is found to match a known marker, the optical detection system 400 may then identify the detected marker 42 as corresponding to the known marker.

The optical detection system 400 may have stored therein, for example at the computer readable storage medium 414, additional information 424 associated with the known marker. Accordingly, when analyzing a detected marker 42, the optical detection system 400 may identify the detected marker 42 as corresponding to a known marker, retrieve the additional information 424 associated with the known marker, and associate the retrieved additional information with the detected marker 42. The additional information 424 may include, for example, position information or object-specific information, such as a type of crane component or object on which the marker 42 is disposed, identification information of the object, product specifications, identification information and the like. Conversely, the optical detection system 400 may detect the absence of a marker 42 that was previously detected or expected to be detected, and determine a status based on the detected absence of the marker 42.

Thus, in the embodiments above, the optical detection system 400 is configured to detect one or more objects in the captured image. In each of these embodiments, when detecting objects in the captured image, the optical detection system 400 is configured to differentiate the objects from the background in the image. In some embodiments, the detected object may be a crane component or a marker on the crane component, wherein the marker is a section of the component that is coated with a special color and/or pattern to help differentiate the crane component from the background. For example, a fluorescent marker, a reflective marker, or other highly visible marker to increase contrast of the crane component relative to the background may be used. Accordingly, using the techniques described herein, the optical detection system 400 may detect in a captured image, for example, a shape, profile, size, particular dimension, orientation, color, pattern or combinations thereof when detecting an object. A space between detected objects or portions of a detected object may also be detected.

In one embodiment, a visible portion of the marker 42 may be captured in an image by the one or more image capture assemblies 410. The optical control system 402 may then convert the captured marker image 42 into a code representing the visible portion of the image. For example, if the marker 42 included five lines that were visible to and captured by the image capture assembly 410, the optical control system 402 may convert the image (i.e., the captured image of the marker 42) into a numeric code of five. The pattern may directly correspond to a measurement, e.g., each line could be one foot apart, or other predetermined unit of measurement, such that the numeric code is a direct measurement. In some embodiments, the numeric code may be compared to a table to look up information associated with the marker 42. In another embodiment, the marker 42 may be disposed at a location on the object that corresponds to qualitative or quantitative positions of the object. For example, when a marker 42 is disposed on a crane component and is moved into the field of view of the image capture assembly 410, the marker 42 may be detected by the optical detection system 400 and identified, for example, by a comparison to the stored markers as detailed above. If the detected marker 42 matches a stored, known marker, the optical control system 402 may then identify and retrieve any additional information 424 that may be associated with the known marker 42 and associate the additional information with the detected marker 42.

Each of the aforementioned detection methods may be combined with other methods listed so as to aid, backup and/or give an alternate or redundant method of determining a status of the crane component. For example, the marker 42 may generally be used for measurements while end or edge detection of the crane component may be used to verify the measurement. In one embodiment, it is envisioned that if the marker 42 were obscured and the image capture assembly 410 missed a portion of the marker 42, the detected edge or end of the crane component may give a reading inconsistent with the captured, or detected, marker 42, and the optical detection system 400 may alert the operator to a possible problem.

Thus, in one embodiment, the optical detection system 400, and in particular, the optical control system 402, may detect various objects, such as a crane component and/or the marker 42 in a captured image using object recognition software, analyze the detected objects, and determine the status of the crane or a crane component based on the analysis of the detected objects. The crane component for which a status is determined may be a crane component detected as an object in the captured image or a separate crane component.

The object recognition software may be stored in the computer-readable storage medium 414. In one embodiment, the object recognition software is conventional, using conventional methods understood by those having ordinary skill in the art to detect or differentiate objects in a captured image or video. It is understood that the present disclosure is not limited to the object recognition techniques described herein, and that other known object recognition techniques or algorithms may be used.

In one embodiment, the optical control system 402 is configured to detect an object in a captured image, wherein the detected object may be one or more of the carrier 12, the superstructure 14, or a marker 42. In one embodiment, the optical control system 402 may analyze the detected object, for example, by comparing the captured image having the detected object to a stored image having a known object. It is envisioned that the detected object itself may be compared to a stored image of a known object as well. In another embodiment, the optical control system 402 may analyze the detected object by comparing the captured image with the detected object to a stored geometrically accurate model of the crane 10. In another embodiment, the optical detection system 402 may analyze the detected object by executing an algorithm to, for example, determine relative positions of one or more detected objects. The stored image and stored geometrically accurate model may be stored in the computer readable storage medium 316, 414 of the crane control system 300 or the optical detection system 400, respectively.

The stored, known objects may have additional information associated therewith. Accordingly, when the optical control system 402 identifies a detected object as matching a known object, the optical control system 402 may then associate the additional information with the detected object. The additional information may be, for example, position information, including slew and lift angle information for a boom.

The optical control system 402 may determine a status of a crane component based on the analysis of the one or more detected objects. In one embodiment, the crane component may be the boom 32, and the status may be, for example, a position of the boom 32. The determined position of the boom 32 may include one or more of a slew angle of the boom 32 and a lift angle of the boom 32.

Figure 5:
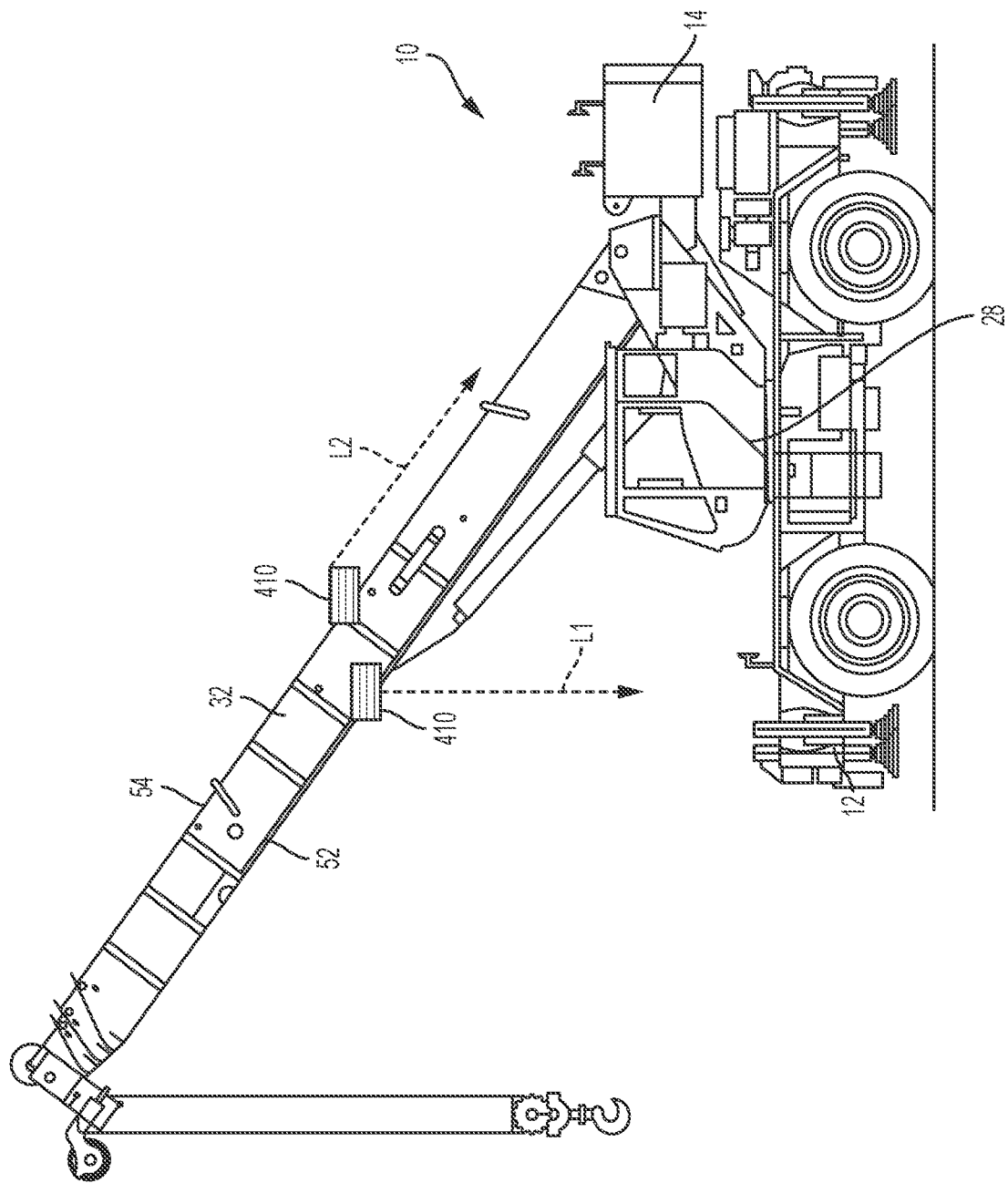
FIG. 5 is a side view of a crane having image capture assemblies installed at different positions on the boom, according to an embodiment.

FIG. 5 is a side view of a crane 10, according to an embodiment. As described above, the optical detection system 400 may include one or more image capture assemblies 410 disposed at different locations on the crane 10. For example, in one embodiment, an image capture assembly 410 may be positioned on a bottom side 52 of the boom 32 or a top side 54 of the boom 32. An image capture assembly 410 positioned on the bottom side 52 of the boom 32 may have a line of sight L1 directed in one direction, for example, toward the carrier 12, while an image capture assembly 410 positioned on the top side 54 of the boom 32 may have a line of sight L2 directed in another direction, for example, toward or along the superstructure 14. In one embodiment, a single image capture assembly 410 is positioned on a boom. However, it is envisioned that multiple image capture assemblies 410 may be positioned on the boom 32 as well.

Figure 6:
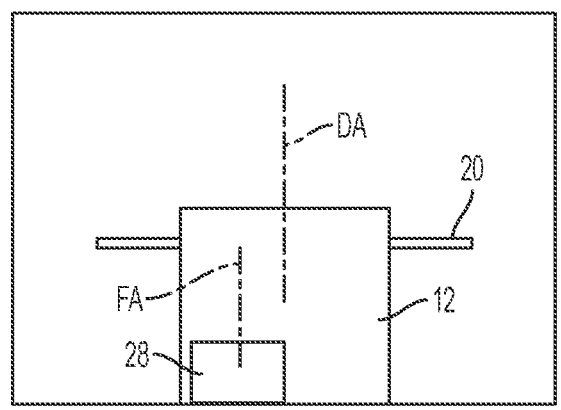
FIG. 6 is a schematic representation of an image captured by an image capture assembly positioned on the bottom of the boom in FIG. 5, with the boom at a first slew angle, according to an embodiment.
Figure 7:
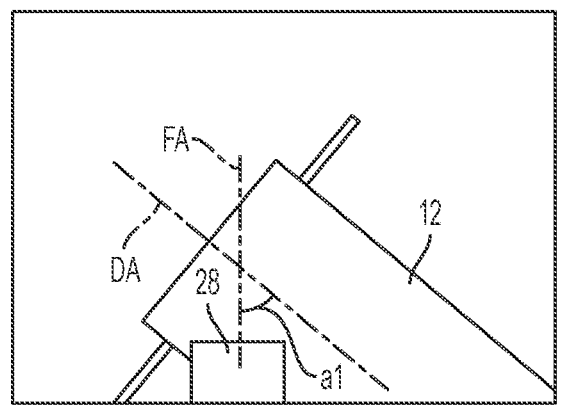
FIG. 7 is a schematic representation of an image captured by an image capture assembly positioned on the bottom of the boom in FIG. 5, with the boom at a second slew angle, according to an embodiment.
Figure 8:
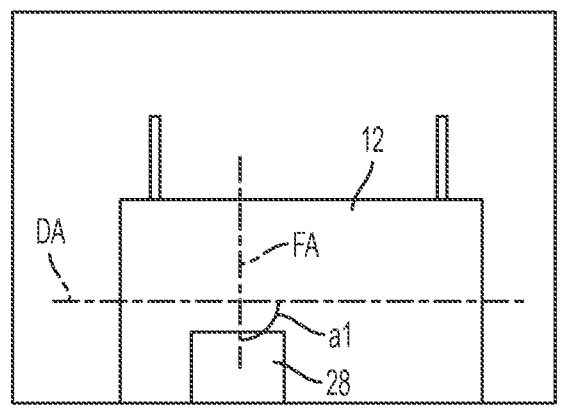
FIG. 8 is a schematic representation of an image captured by an image capture assembly positioned on the bottom of the boom in FIG. 5, with the boom at a third slew angle, according to an embodiment.

FIGS. 6-8 are examples of schematic representations of captured images from an image capture assembly 410 positioned on the bottom side 52 of the boom 32, with the boom 32 positioned at different slew angles. In one embodiment, the image capture assembly 410 has a sufficiently wide field of view so that the carrier 12 will appear in the captured image across an entire slewing range of the boom 32.

According to an embodiment, the optical control system 402 may detect the carrier 12 in the captured image using, for example, one of the object recognition techniques described above. For example, in one embodiment, one or more of a shape, profile, size, particular dimension, orientation, color, pattern, or the like, of a visible portion of the carrier 12 may be detected in the captured image. It is understood that although the some properties, such as the actual shape, profile and/or size of the carrier 12 remain constant, a detected shape, profile, and/or size of the detected carrier 12 will vary in the captured images as the slew angle changes, for example, as shown in FIGS. 6-8. The particular dimension of the carrier 12 may be detected for example, by counting pixels in the captured image between two reference points, such as detected edges of the carrier 12.

The optical control system 402 may compare the detected carrier 12 in the captured image to a known carrier in a stored image, stored in the computer readable storage medium 316 or 414. In one embodiment, the optical control system 402 may compare the detected carrier 12 to multiple stored images of known carriers, for example, to identify a known carrier that corresponds to the detected carrier 12. In one embodiment, the stored images of known carriers may be acquired through a calibration process, where the superstructure 14 is rotated relative to the carrier 12 to known slew angles, an image is captured by the image capture assembly 410 and the captured image taken during the calibration is stored in the memory 316 or 414, along with the corresponding slew angle.

The known carrier may have additional information associated therewith in the computer readable storage medium 316 or 414. The additional information may include, for example, a boom slew angle corresponding to the known carrier. That is, each known carrier may have a particular boom slew angle associated therewith. Accordingly, if the optical control system 402 identifies the detected carrier 12 as corresponding to a known carrier in a stored image, the optical control system 402 may associate the additional information, including the boom slew angle, to the detected carrier 12. In this manner, the optical control system 402 may determine a slew angle of the boom 32.

In one embodiment, the comparison carried out by the optical control system 402 may be carried out by, for example, superimposing the captured image of the detected carrier 12 over the stored image of the known carrier to find, for example, a known carrier having substantially the same shape, profile, size, orientation, particular dimension, pattern, color or the like, or some combination thereof, as the detected carrier 12. Alternatively, or in addition, the comparison may be a comparison of a shape, profile, size, orientation, particular dimension, pattern, color or the like, of the detected carrier 12 to those of the known carrier, for instance, by comparing pixel locations of the detected and known carriers in the captured and stored images, respectively.

In another embodiment, the optical control system 402 may compare the detected carrier 12 in the captured image to a geometrically accurate model of the crane 10 stored in the computer readable storage medium 316 or 414. If the optical control system 402 identifies the detected carrier 12 as corresponding to a carrier of the geometrically accurate model of the crane, the optical control system 402 may associate additional information, including a boom slew angle, with the detected carrier 12. In this manner, the optical control system 402 may determine a slew angle of the boom 32.

In still another embodiment, the optical control system 402 may execute an algorithm stored in the computer readable storage medium 316 or 414 to determine a slew angle of the boom 32. With further reference to FIGS. 6-8, for example, the optical control system 402 may provide a fixed axis FA in the captured image which corresponds to an orientation of the boom 32. The fixed axis FA extends in a fixed direction in the captured images as the slew angle changes. The optical control system 402 may also provide a detected axis DA in the captured image. The detected axis DA may be detected, for example, as an axis of the detected carrier 12. The optical control system 402 may then determine the slew angle of the boom 32 by determining the angle al between the fixed axis FA and detected axis DA.

It is understood that the fixed axis FA and the detected axis DA may be displayed together with the captured image on a display device, or, alternatively, may be provided in the computer readable storage medium 316 or 414 and analyzed in the crane control system 300 or optical control system 402 without being displayed. In addition, FIGS. 6-8 generally show the fixed axis FA as an axis of the cab 28. However, the present disclosure is not limited thereto. For example, the fixed axis FA may be a longitudinal axis of the boom 32 or an axis of the superstructure 14.

Figure 9:
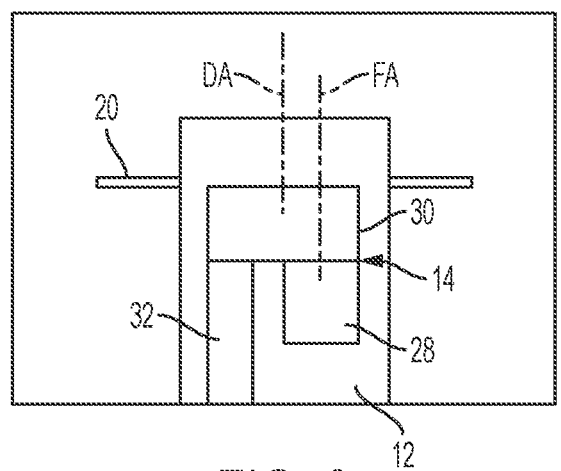
FIG. 9 is a schematic representation of an image captured by an image capture assembly positioned on the top of the boom in FIG. 5, with the boom at a first slew angle, according to an embodiment.
Figure 10:
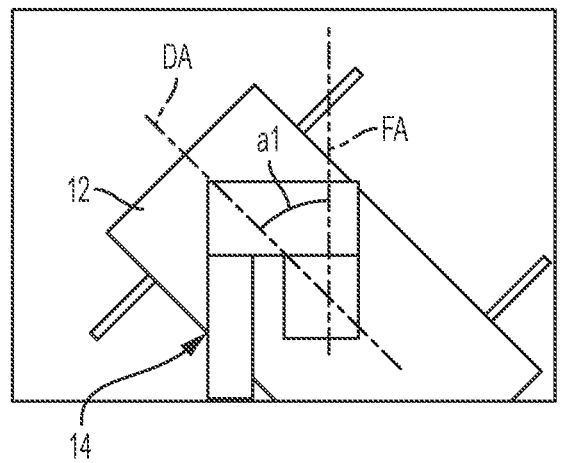
FIG. 10 is a schematic representation of an image captured by an image capture assembly positioned on the top of the boom in FIG. 5, with the boom at a second slew angle, according to an embodiment.
Figure 11:
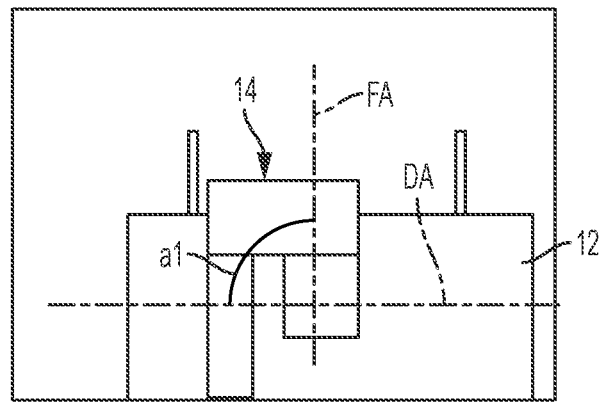
FIG. 11 is a schematic representation of an image captured by an image capture assembly positioned on the top of the boom in FIG. 5, with the boom at a third slew angle, according to an embodiment.

FIGS. 9-11 are examples of schematic representations of images captured from an image capture assembly 410 positioned on the top side 54 of the boom 32, with the boom 32 positioned at different slew angles. In one embodiment, the image capture assembly 410 has a sufficiently wide field of view, such that the superstructure 14 will appear in the captured image across entire an slewing range of the boom 32.

According to an embodiment, the optical control system 402 may detect the superstructure 14 in the captured image, for example, using one of the object recognition techniques described above. For example, in one embodiment, a shape, profile, size, orientation, particular dimension, pattern, color, or the like of a visible portion of the superstructure 14 may be detected in the captured image. Optionally, the optical control system 402 may also detect individual crane components of the superstructure 14, such as the cab 28, the counterweight assembly 30 and the boom 32. Further still, a visible portion of the carrier 12 may be detected, as well as an orientation of the carrier 12 relative to the superstructure 14. As described above, a detected shape, profile, size, orientation, dimension, pattern, color or the like, of the visible portion of the carrier 12 may change in the captured image as the slew angle changes. That is, depending on the slew angle and position of the boom 32, the perception of the carrier 12 changes in the captured image.

The optical control system 402 may compare the detected superstructure 14, or the relative orientation of the carrier 12 and the superstructure 14, in the captured image to a known superstructure 14 or known relative orientation of a carrier and superstructure in a stored image, stored in the computer readable storage medium 316 or 414. In one embodiment, the optical control system 402 may compare the detected superstructure or detected relative orientation to multiple stored images of known superstructures or relative orientations, for example, to identify a known superstructure or relative orientation that corresponds to the detected superstructure 14 or detected relative orientation of the carrier 12 and superstructure 14.

The known superstructure or relative orientation of the carrier and superstructure may have additional information associated therewith in the computer readable storage medium 316 or 414. The additional information may include, for example, a boom slew angle corresponding to the known superstructure or relative orientation. That is, each known superstructure or relative orientation may have a particular slew angle associated therewith. Accordingly, if the optical control system 402 identifies the detected superstructure 14 or relative orientation of the carrier 12 and superstructure 14 as corresponding to a known superstructure 14 or relative orientation in a stored image, the optical control system 402 may associate the additional information, including the boom slew angle, to the detected superstructure 14. In this manner, the optical control system 402 may determine a slew angle of the boom 32.

In one embodiment, the comparison carried out by the optical control system 402 may be carried out by, for example, superimposing the captured image of the superstructure 14 or relative orientation of the carrier 12 and superstructure 14 over the stored image of the known superstructure or relative orientation of a carrier and superstructure to find, for example, a known superstructure or relative orientation having substantially the same shape, profile, size, orientation, particular dimension, pattern, color or the like, or some combination thereof, as the detected superstructure 14 or detected relative orientation of the carrier 12 and superstructure 14. Alternatively, or in addition, the comparison may be a comparison of a shape, profile, size, orientation, particular dimension, pattern, color or the like, of the detected superstructure 14 or relative orientation to those of the known superstructure or relative orientation, for instance, by comparing pixel locations of the detected and known superstructures and relative orientations in the captured and stored images, respectively.

In another embodiment, the optical control system 402 may compare the detected superstructure 14, or the detected relative orientation of the carrier and superstructure, in the captured image to a geometrically accurate model of the crane stored in the computer readable storage medium 316 or 414. If the optical control system 402 identifies the detected superstructure 14 or the detected relative orientation as corresponding to a superstructure or relative orientation of the geometrically accurate model of the crane, the optical control system 402 may associate additional information, including a boom slew angle, with the detected superstructure 14 or relative orientation of the carrier 12 and superstructure 14. In this manner, the optical control system 402 may determine a slew angle of the boom 32.

In still another embodiment, the optical control 402 may execute an algorithm stored in the computer readable storage medium 316 or 414 to determine a slew angle of the boom 32. With further reference to FIGS. 9-11, for example, the optical control system 402 may provide a fixed axis FA in the captured image which corresponds to an orientation of the boom 32. The fixed axis FA extends in a fixed direction in the captured images as the boom slew angle changes. The optical control system 402 may also provide a detected axis DA in the captured image. The detected axis DA may be detected, for example, as an axis of the detected carrier 12. The optical control system 402 may then determine the slew angle of the boom 32 by determining the angle between the fixed axis FA and detected axis DA.

Figure 12:
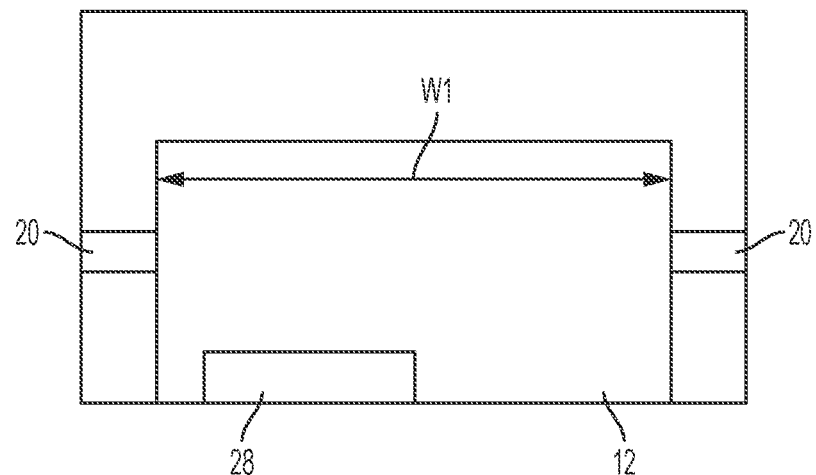
FIG. 12 is a schematic representation of an image captured by an image capture assembly positioned on the bottom of the boom in FIG. 5, with the boom at a first lift angle, according to an embodiment.
Figure 13:
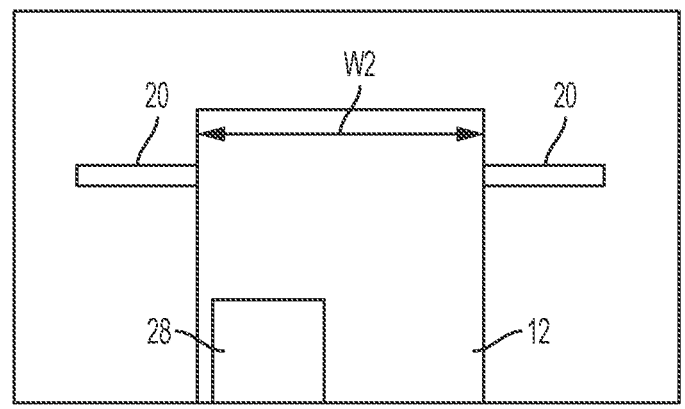
FIG. 13 is a schematic representation of an image captured by an image capture assembly positioned on the bottom of the boom in FIG. 5, with the boom at a second lift angle, according to an embodiment.

FIGS. 12 and 13 are examples of schematic representations of captured images from an image capture assembly 410 positioned on the bottom side 52 of the boom 32, with the boom 32 positioned at different lift angles.

Referring to FIGS. 12 and 13, the optical control system 402 is configured to detect the carrier 12 in the captured image. As a lift angle of the boom 32 changes, a perceived dimension or size of the detected carrier 12 changes. For example, referring to FIG. 12, with the boom 32 at a first lift angle, the carrier 12 is detected having a first width W1 in the captured image. Referring to FIG. 13, with the boom 32 at a second lift angle, greater that the first lift angle, the carrier 12 is detected having a second width W2, less than the first width W1, in the captured image.

In one embodiment, the optical control system 402 analyzes the detected carrier 12 in the captured image by comparing the carrier 12 to a known carrier in a stored image, stored in the computer readable storage medium 316 or 414. In one embodiment, the optical control system 402 may compare the detected carrier 12 to multiple stored images of known carriers, for example, to identify a known carrier that corresponds to the detected carrier 12.

The known carrier may have additional information associated therewith in the computer readable storage medium 316 or 414. The additional information may include, for example, a lift angle of the boom corresponding to the known carrier image. That is, each known carrier in a stored image may have a particular boom lift angle associated therewith. Accordingly, if the optical control system 402 identifies the detected carrier 12 as corresponding to a known carrier in a stored image, the optical control system 402 may associate the additional information, including the boom lift angle, to the detected carrier 12. In this manner, the optical control system 402 may determine a lift angle of the boom 32.

In one embodiment, the comparison carried out by the optical control system 402 may be carried out by, for example, superimposing the captured image of the detected carrier 12 over the stored image of the known carrier to find, for example, a known carrier having substantially the same shape, profile, size, orientation, particular dimension, pattern, color, or the like, or some combination thereof, as the detected carrier 12. Alternatively, or in addition, the comparison may be a comparison of a shape, profile, size, orientation, particular dimension, pattern, color, or the like, of the detected carrier 12 to those of the known carrier, for instance, by comparing pixel locations of the detected and known carriers in the captured and stored images, respectively.

In another embodiment, the optical control system 402 may compare the captured image having the carrier 12 detected therein to a geometrically accurate model of the crane 10. If the optical detection system 402 identifies the detected carrier 12 as corresponding to a carrier of the geometrically accurate model of the crane, the optical control system 402 may associate additional information, including a boom lift angle, with the detected carrier 12. In this manner, the optical detection system 402 may determine a lift angle of the boom 32.

In still another embodiment, the optical control system 402 may execute an algorithm stored in the computer readable storage medium 316 or 414 to determine a lift angle of the boom 32. For example, in one embodiment, and with reference to FIGS. 12 and 13, a detected size (and dimensions) of the detected carrier 12 changes with a change in the lift angle of the boom 32. The optical control system 402 may, for example, measure a change in the detected size or dimensions by counting a change in the number of pixels that are part of the detected carrier 12 in the captured image. A change in the number of pixels may be correlated to a change in boom angle. Such a relationship may be stored in a table in the computer readable storage medium 316 or 414, for example. Accordingly, with an initial boom angle known, and a relationship between a number of pixels and the boom lift angle known, the optical control system 402 may determine a boom lift angle based on a change in the number of pixels associated with the detected carrier 12. In one embodiment, the change in the number of pixels may be across a predetermined dimension of the carrier 12 in the captured image, such as a width W1, W2.

Figure 14:
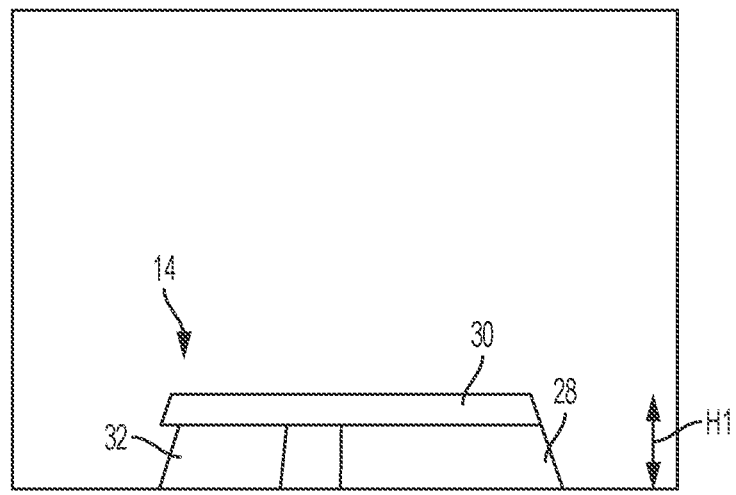
FIG. 14 is a schematic representation of an image captured by an image capture assembly positioned on the top of the boom in FIG. 5, with the boom at a first lift angle, according to an embodiment.
Figure 15:
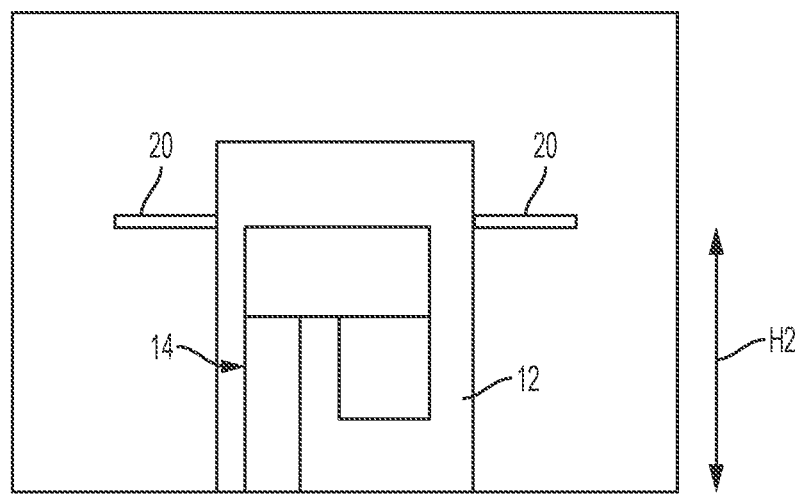
FIG. 15 is a schematic representation of an image captured by an image capture assembly positioned on the top of the boom in FIG. 5, with the boom at a second lift angle, according to an embodiment.

FIGS. 14 and 15 are examples of schematic representations of captured images from an image capture assembly 410 positioned on the top side 54 of the boom 32, with the boom 32 positioned at different lift angles.

Referring to FIGS. 14 and 15, the optical control system 402 is configured to detect the superstructure 14 in the captured image. In one embodiment, individual crane components of the superstructure 14, such as the cab 28, counterweight assembly 30 and boom 32 may be detected as well. As a lift angle of the boom 32 changes, a perceived or detected dimension or size of the detected superstructure 14 changes in the captured image. For example, referring to FIG. 14, with the boom 32 at a first lift angle, the superstructure 14 is detected having a first height H1 in the captured image. Referring to FIG. 15, with the boom 32 at a second lift angle, greater that the first lift angle, the superstructure 14 is detected having a second height H2, different than the first height H1, in the captured image. Other detected sizes or dimensions of the superstructure 14 may vary with a change in lift angle as well.

In one embodiment, the optical control system 402 analyzes the detected superstructure 14 in the captured image by comparing the superstructure 14 to a known superstructure in a stored image, stored in the computer readable storage medium 316 or 414. In one embodiment, the optical control system 402 may compare the detected superstructure 14 to multiple stored images of known superstructures, for example, to identify a known superstructure that corresponds to the detected superstructure 14.

The known superstructure may have additional information associated therewith in the computer readable storage medium 316 or 414. The additional information may include, for example, a lift angle of the boom corresponding to the known superstructure image. That is, each known superstructure in a stored image may have a particular boom lift angle associated therewith. Accordingly, if the optical control system 402 identifies the detected superstructure 14 as corresponding to a known superstructure in a stored image, the optical control system 402 may associate the additional information, including the boom lift angle, to the detected superstructure 14. In this manner, the optical control system 402 may determine a lift angle of the boom 32.

In one embodiment, the comparison carried out by the optical control system 402 may be carried out by, for example, superimposing the captured image of the detected superstructure 14 over the stored image of the known superstructure to find, for example, a known superstructure having substantially the same shape, profile, size, orientation, particular dimension, pattern, color or the like, or some combination thereof, as the detected superstructure 14. Alternatively, or in addition, the comparison may be a comparison of a shape, profile, size, orientation, particular dimension, pattern, color or the like, of the detected superstructure 14 to those of the known superstructure, for instance, by comparing pixel locations of the detected and known superstructure in the captured and stored images, respectively.

In another embodiment, the optical control system 402 may compare the captured image having the superstructure 14 detected therein to a geometrically accurate model of the crane 10. If the optical detection system 402 identifies the detected superstructure 14 as corresponding to a superstructure of the geometrically accurate model of the crane, the optical control system 402 may associate additional information, including a boom lift angle, with the detected superstructure 14. In this manner, the optical control system 402 may determine a lift angle of the boom 32.

In still another embodiment, the optical control system 402 may execute an algorithm stored in the computer readable storage medium 316 or 414 to determine a lift angle of the boom 32. For example, in one embodiment, and with reference to FIGS. 14 and 15, a detected size (and dimensions) of the detected superstructure 14 changes with a change in the lift angle of the boom 32. The optical control system 402 may, for example, measure a change in the detected size or dimensions by counting a change in the number of pixels that are part of the detected superstructure 14 in the captured image. A change in the number of pixels may be correlated to a change in boom angle. Such a relationship may be stored in a table in the computer readable storage medium 316 or 414, for example. Accordingly, with an initial boom angle known, and a relationship between a number of pixels and the boom lift angle known, the optical control system 402 may determine a boom lift angle based on a change in the number of pixels associated with the detected superstructure 14. In one embodiment, the change in the number of pixels may be across a predetermined dimension of the superstructure 14 in the captured image, such as a height H1, H2.

In another embodiment, a marker 42 may be disposed on the crane 10 and detected in a captured image by the optical control system 402. A lift angle of the boom 32 may be determined by analyzing the detected marker 42.

Figure 16:
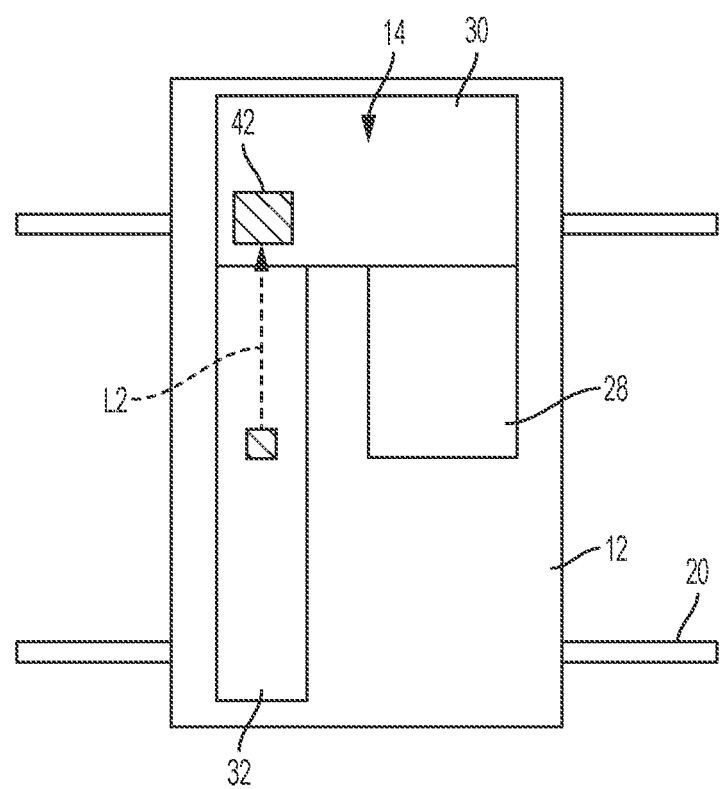
FIG. 16 is a diagram showing a top view of a crane having an optical detection system, according to an embodiment.

FIG. 16 is a schematic diagram representing a top view of the crane 10. In one embodiment, the image capture assembly 410 may be positioned on the boom 32, and have a line of sight L2 along the superstructure 14. A field of view of the image capture assembly 410 may include a portion of the superstructure 14 throughout an entire lift angle range of the boom 32. In one embodiment, the marker 42 is disposed in the field of view of the image capture assembly 410 throughout the lift angle range. In one embodiment, the marker 42 is disposed behind the boom 32.

Figure 17:
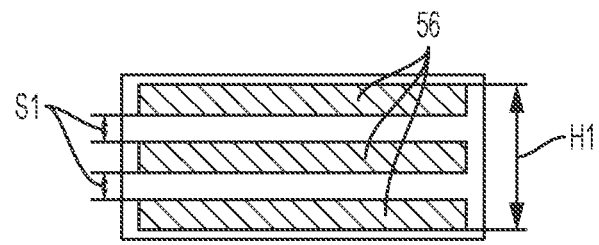
FIG. 17 shows an example of a marker on a crane viewed from a boom positioned at a first lift angle, according to an embodiment.
Figure 18:
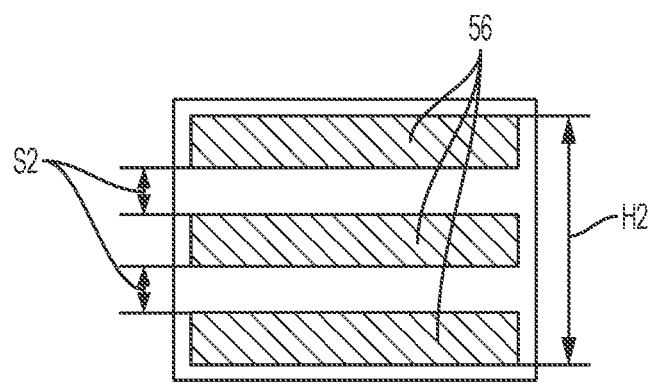
FIG. 18 shows an example of a marker on a crane viewed from a boom positioned at a second lift angle, according to an embodiment.
Figure 19:
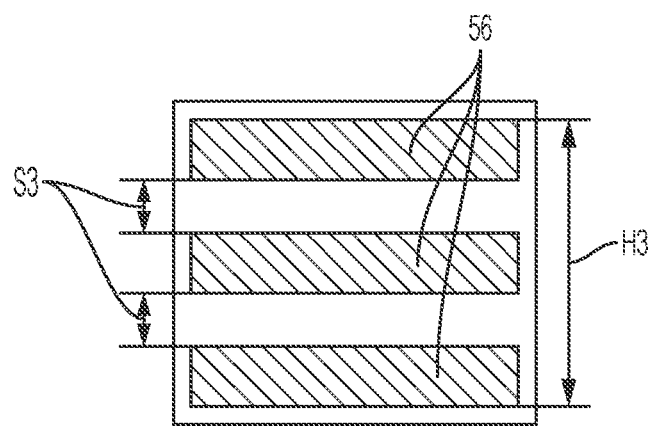
FIG. 19 shows an example of a marker on a crane viewed from a boom positioned at a third lift angle, according to an embodiment.

FIGS. 17-19 are examples of the marker 42, in views representing how the markers 42 may be captured in images taken by the image capture assembly 410, with the boom 32 at different lift angles. In one embodiment, the marker 42 may include graduations 56. As the lift angles changes, the perspective with which the marker 42 is viewed by the image capture assembly 410, and in turn, is captured in an image, changes as well. For example, a detected distance S1, S2, S3 between graduations 56 or a height H1, H2, H3 of the detected marker 42 may change in captured images taken a different boom lift angles. In one embodiment, an increase in the distance between graduations 56 or a height of the marker 42, as detected in the captured image, may correspond to an increase in boom lift angle. However, the present disclosure is not limited to such a configuration, and it is understood that the marker 42 may have differently arranged graduations, or may be differently positioned relative to the image capture assembly 410, such that distances between graduations 56 or a height of the marker 42, as detected in a captured image, decrease with an increase in boom lift angle. In one embodiment, portions of the marker 42 may become hidden or exposed as the lift angle changes.

In one embodiment, the optical control system 402 analyzes the detected marker 42 in the captured image by comparing the detected marker 42 to a known marker in a stored image, stored in the computer readable storage medium 316 or 414. In one embodiment, the optical control system 402 may compare the detected marker 42 to multiple stored images of known markers, for example, to identify a known marker that corresponds to the detected marker 42.

The known marker may have additional information associated therewith in the computer readable storage medium 316 or 414. The additional information may include, for example, a lift angle of the boom 32 corresponding to the known marker image. That is, each known marker in a stored image may have a particular boom lift angle associated therewith. Accordingly, if the optical control system 402 identifies the detected marker 42 as corresponding to a known marker in a stored image, the optical control system 402 may associate the additional information, including the boom lift angle, to the detected marker 42. In this manner, the optical control system 402 may determine a lift angle of the boom 32.

In one embodiment, the comparison carried out by the optical control system 402 may be carried out by, for example, superimposing the captured image of the detected marker 42 over the stored image of the known marker to find, for example, a known marker having substantially the same shape, profile, size, orientation, particular dimension, pattern, color or the like, or some combination thereof, as the detected marker 42. Alternatively, or in addition, the comparison may be a comparison of a shape, profile, size, orientation, particular dimension, pattern, color or the like, of the detected marker 42 to those of the known marker, for instance, by comparing pixel locations of the detected and known markers in the captured and stored images, respectively.

Figure 20:
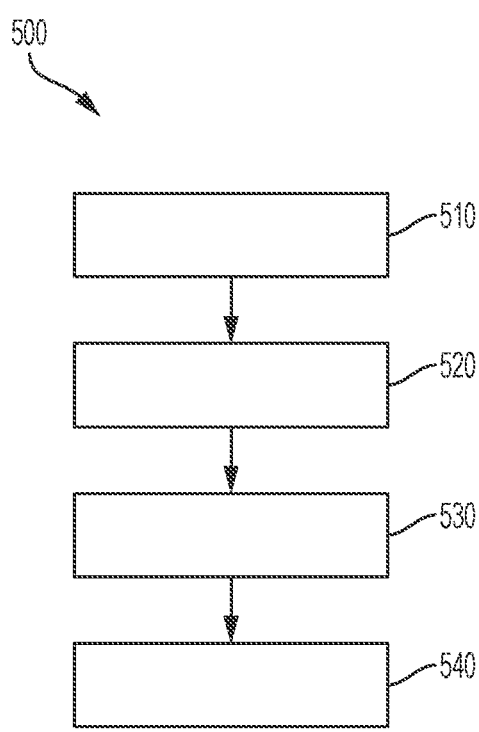
FIG. 20 is a block diagram showing a method of determining a status of a boom on a crane, according to an embodiment.

FIG. 20 is a block diagram showing a method 500 of determining a status of a boom on a crane, according to an embodiment. The method includes capturing 510, with an image capture assembly 410, an image of a crane carrier 12, a crane superstructure 14, or both, and detecting 520, with an optical control system 402, one or more objects in the captured image, wherein the one or more objects include one or more of: the crane carrier 12, the crane superstructure 14, and a marker 42. The method further includes analyzing 530, with the optical control system 402, the detected objects, and determining 540, with the optical control system 402, a status of the boom 32 based on the analysis of the detected objects.

Accordingly, in the embodiments above, an image capture assembly may capture an image, or series of images, of an object, such as a crane component or a marker, and the images may be analyzed by the optical detection system 400 to determine a status or condition of a crane component. The crane component for which a status is determined may be the detected crane component from the captured image, or a separate crane component. In some embodiments, the operator may be alerted to the status, the crane operations, such as boom movement, may be controlled or prevented by the crane control system 300, or both, in response to a determined status. In one embodiment, the optical detection system 400, with a captured image of one or more of a carrier, a superstructure, and a marker, may determine a status relating to the position of boom 32. For example, by detecting a carrier and/or a superstructure in the captured image, a slew angle and a lift angle of the boom 32 may be determined. In another embodiment, a lift angle of the boom 32 may be determined by detecting a marker 42 in the captured image.

In the embodiments above, the optical detection system 400 may determine a position of the boom 32, including a slew angle and a lift angle, without the use of sensors, such as proximity sensors. In another embodiment, the optical detection system 400 may operate in conjunction with various known sensors to determine a slew angle and lift angle of the boom 32. For example, the optical detection system 400 may confirm sensor data relating to boom position, or vice versa.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular. In addition, it is understood that features any of the embodiments above may be used together with, implemented in, or replace features of the other embodiments described herein, as suitable.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A crane comprising:
   a carrier;
   a superstructure rotatably coupled to the carrier, the superstructure including a boom and a counterweight assembly;
   an optical detection system comprising:
      an image capture assembly comprising one or more image capture devices mounted on the boom and positioned to capture an image of the carrier and the superstructure; and
      an optical control system configured to:
         detect the carrier and the superstructure in the captured image;
         analyze at least one of the detected carrier and superstructure in the captured image; and
         determine a position of the boom based on the analysis of at least one of the detected carrier and superstructure in the captured image, wherein the determined position includes a lift angle and a slew angle of the boom,
   wherein the optical control system is configured to detect the superstructure by detecting a marker disposed on the counterweight assembly in the captured image,
   wherein the optical control system is further configured to analyze the marker and determine the lift angle of the boom based on the analysis of the marker, and
   wherein the marker comprises a plurality of graduations, and the optical control system is configured to detect the plurality of graduations in the captured image, analyze the graduations and determine the lift angle of the boom based on the analysis of the graduations.

2. The crane of claim 1, wherein the one or more image capture devices include a camera.

3. The crane of claim 1, wherein the optical control system analysis includes comparing the detected carrier or superstructure in the captured image to a known carrier or superstructure in a stored image.

4. The crane of claim 3, wherein the optical control system retrieves additional information associated with the known carrier or superstructure based on the comparison, and the determined status is based on the additional information.

5. The crane of claim 4, wherein the additional information includes one or more of a boom slew angle and a boom lift angle corresponding to the known carrier or superstructure in the stored image.

6. The crane of claim 3, wherein the comparison is based on one or more of: a detected shape, profile, size, particular dimension, or orientation of the detected carrier or superstructure in the captured image.

7. The crane of claim 1, wherein the optical control system analysis includes comparing the detected carrier or superstructure in the captured image to a geometrically accurate model of the crane.

8. The crane of claim 1, wherein the optical control system analysis includes executing an algorithm to calculate one or more of the lift angle or the slew angle of the boom.

9. The crane of claim 1, further comprising a crane control system operably coupled to boom and configured to control or prevent one or more crane operations based on the determined status.

10. An optical detection system for a crane having a carrier and a superstructure rotatably mounted on the carrier, the superstructure having a boom and a counterweight assembly, the system comprising:
   an image capture assembly comprising one or more image capture devices mounted on the boom and configured to capture an image of the carrier and the superstructure; and an optical control system configured to:
  detect the carrier and the superstructure in the captured image;
  analyze at least one of the detected carrier and superstructure in the captured image; and
  determine a position of the boom based on the analysis of at least one of the detected carrier and superstructure in the captured image, wherein the determined position includes a lift angle and a slew angle of the boom,
wherein the optical control system is configured to detect the superstructure by detecting a marker disposed on the counterweight assembly in the captured image,
wherein the optical control system is further configured to analyze the marker and determine the lift angle of the boom based on the analysis of the marker, and
wherein the marker comprises a plurality of graduations, and the optical control system is configured to detect the plurality of graduations in the captured image, analyze the graduations and determine the lift angle of the boom based on the analysis of the graduations.

11. The optical detection system of claim 10, wherein the optical control system analysis includes comparing the detected carrier or superstructure in the captured image to a known carrier or superstructure in a stored image.

12. The optical detection system of claim 10, wherein the optical control system analysis includes comparing the detected carrier or superstructure in the captured image to a geometrically accurate model of the crane.

13. The optical detection system of claim 10, wherein the optical control system analysis includes executing an algorithm to calculate one or more of the lift angle the slew angle of the boom.

14. A method of determining a status of a boom on a crane, the method comprising:
  capturing, with an image capture assembly, an image of a crane carrier and a crane superstructure rotatably mounted on the crane carrier, the crane superstructure comprising a boom and a counterweight assembly and the image capture assembly positioned on the boom;
  detecting, with an optical control system, the crane carrier and the crane superstructure in the captured image;
  analyzing, with the optical control system, at least one of the detected crane carrier and crane superstructure in the captured image; and
  determining, with the optical control system, a position of the boom based on the analysis of at least one of the detected crane carrier and the crane superstructure in the captured image, wherein the determined position includes a lift angle and a slew angle of the boom,
wherein the optical control system is configured to detect the crane superstructure by detecting a marker disposed on the counterweight assembly in the captured image,
wherein the optical control system is further configured to analyze the marker and determine the lift angle of the boom based on the analysis of the marker, and
wherein the marker comprises a plurality of graduations, and the optical control system is configured to detect the plurality of graduations in the captured image, analyze the graduations and determine the lift angle of the boom based on the analysis of the graduations.

15. The method of claim 14, wherein the analyzing further comprises comparing the detected crane carrier or the crane superstructure in the captured image to a known crane carrier or crane superstructure in a stored image.

16. The method of claim 14, wherein the analyzing further comprises comparing the detected crane carrier or crane superstructure in the captured image to a geometrically accurate model of the crane.

17. The method of claim 14, wherein the analyzing further comprises executing an algorithm to calculate one or more of the lift angle and the slew angle of the boom.

* * * * *

UNITED STATES PATENT AND TRADEMARK OFFICE
CERTIFICATE OF CORRECTION

PATENT NO. : 11,124,392 B2
APPLICATION NO. : 15/819369
DATED : September 21, 2021
INVENTOR(S) : Rudy et al.

Page 1 of 1

It is certified that error appears in the above-identified patent and that said Letters Patent is hereby corrected as shown below:

In the Specification

Column 11, Lines 53-54, delete "angle al" and insert -- angle a1 --, therefor.

In the Claims

Column 19, Claim 13, Line 31, delete "angle the" and insert -- angle and the --, therefor.

Signed and Sealed this
Eighth Day of March, 2022

Drew Hirshfeld
*Performing the Functions and Duties of the
Under Secretary of Commerce for Intellectual Property and
Director of the United States Patent and Trademark Office*